United States Patent
Yamamoto

(10) Patent No.: US 8,867,218 B2
(45) Date of Patent: Oct. 21, 2014

(54) ELECTRONIC APPARATUS AND METHOD OF MANUFACTURING HOLDING MEMBER

(75) Inventor: Jiro Yamamoto, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 13/309,096

(22) Filed: Dec. 1, 2011

(65) Prior Publication Data

US 2012/0155037 A1 Jun. 21, 2012

(30) Foreign Application Priority Data

Dec. 16, 2010 (JP) .................................. 2010-280671

(51) Int. Cl.
- *H05K 1/00* (2006.01)
- *G03B 17/02* (2006.01)
- *H04N 5/225* (2006.01)

(52) U.S. Cl.
CPC .............. *H04N 5/2252* (2013.01); *G03B 17/02* (2013.01)
USPC ....... 361/749; 361/679.01; 361/748; 361/750

(58) Field of Classification Search
USPC ............. 361/749, 679.01, 748, 750; 72/379.2
See application file for complete search history.

(56) References Cited

U.S. PATENT DOCUMENTS 8,289,720 B2 * 10/2012 Ishikawa ....................... 361/749

FOREIGN PATENT DOCUMENTS

| JP | 05-082820 A | 4/1993 |
| JP | 2003-273541 A | 9/2003 |
| JP | 2008-203632 | 9/2008 |
| JP | 2010-049175 | 3/2010 |
| JP | 2010-049175 | * 4/2010 |

OTHER PUBLICATIONS

The above references were cited in a Jun. 24, 2014 Japanese Office Action, a copy of which is enclosed without an English Translation, that issued in Japanese Patent Application No. 2010-280671.

* cited by examiner

*Primary Examiner* — Andargie M Aychillhum

(74) *Attorney, Agent, or Firm* — Cowan, Liebowitz & Latman, P.C.

(57) ABSTRACT

An electronic apparatus includes a metal holding member. The holding member includes a first region, a second region formed by hemming the first region, and a third region formed by bending perpendicularly relative to the second region at a bending part. The first region has an opening part. A part of the opening part is blocked by the bending part.

2 Claims, 4 Drawing Sheets

ELECTRONIC APPARATUS AND METHOD OF MANUFACTURING HOLDING MEMBER

BACKGROUND OF THE INVENTION

1. Field of the Invention

The present invention relates to an electronic apparatus that includes a metal holding member holding an internal structure, and a method of manufacturing the holding member.

2. Description of the Related Art

An electronic apparatus that includes an image-pickup apparatus such as a digital camera often has a display such as a liquid crystal panel which is used to display various kinds of information (in the case of the image-pickup apparatus, a display of determination of an image region, a display of confirmation of a shot image and a display of menus). A large display of the electronic apparatus is preferred in a market for the electronic apparatus for the reason that the display has various and important uses. In recent years, a size of the display becomes larger so as to meet the requirement of the market for the electronic apparatus.

The display such as the liquid crystal is constitutionally weak against an external pressure and an external impact. Therefore, holding the back side of the electronic apparatus on a broad uniform surface is the most effective to prevent the damage by the external force to the display in using or carrying the electronic apparatus.

On the other hand, miniaturization of the electronic apparatus is requested for the market. Especially, operation members such as a power button to turn on the digital camera, a zoom lever to adjust an angle of view for shooting, and a shutter button to give instructions for shooting are arranged on the upper surface of the digital camera in many cases. Miniaturization of the digital camera can be realized by storing the operation members in a projected area of the liquid crystal panel.

Japanese Patent Laid-Open No. 2010-49175 discloses a metal chassis holding the back side of a liquid unit on a large area an image-pickup lens unit, and a top plate holding a flexible wiring substrate corresponding to the upper surface operation member.

Additionally, Japanese Patent Laid-Open No. 2008-203632 discloses a metal chassis which holds both the back side of a liquid unit on a large area, and a flexible wiring substrate corresponding to the upper surface operation member.

However, the configuration disclosed in Japanese Patent Laid-Open No. 2010-49175 needs a component (the top plate) to hold the flexible wiring substrate corresponding to the upper surface operation member, and screws to fasten the top plate. As a result, a rise of component counts and assembly man-hours are caused.

On the other hand, in the configuration disclosed in Japanese Patent Laid-Open No. 2008-203632, a metal chassis holds both the liquid unit and the flexible wiring substrate corresponding to the upper surface operation member. Therefore, a few component counts and assembly man-hours are required. However, the metal chassis has a bending form in the projected area of the liquid unit so as to form the configuration holding the flexible wiring substrate corresponding to the upper surface operation member. The liquid unit has the potential to damage by the external force to the liquid unit because a region which has the bending form cannot hold the back side of the liquid unit.

SUMMARY OF THE INVENTION

The present invention provides a chassis configuration capable of holding both the back side of the display widely and also holding a substrate perpendicular to the display by a few component counts and assembly man-hours.

An electronic apparatus as one aspect of the present invention includes a metal holding member. The holding member includes a first region, a second region formed by hemming the first region, and a third region formed by bending perpendicularly relative to the second region at a bending part. The first region has an opening part. Apart of the opening part is blocked by the bending part.

A method of manufacturing a holding member as another aspect of the present invention includes the steps of forming an opening part on a planar metal plate, hemming the metal plate so as to form a first region which includes the opening part and a second region, and forming a third region perpendicular to the second region by pressing the second region with a press piece which passes through the opening part of the first region.

Further features and aspects of the present invention will become apparent from the following description of exemplary embodiments with reference to the attached drawings.

DESCRIPTION OF THE PREFERRED EMBODIMENTS

Figure 1:
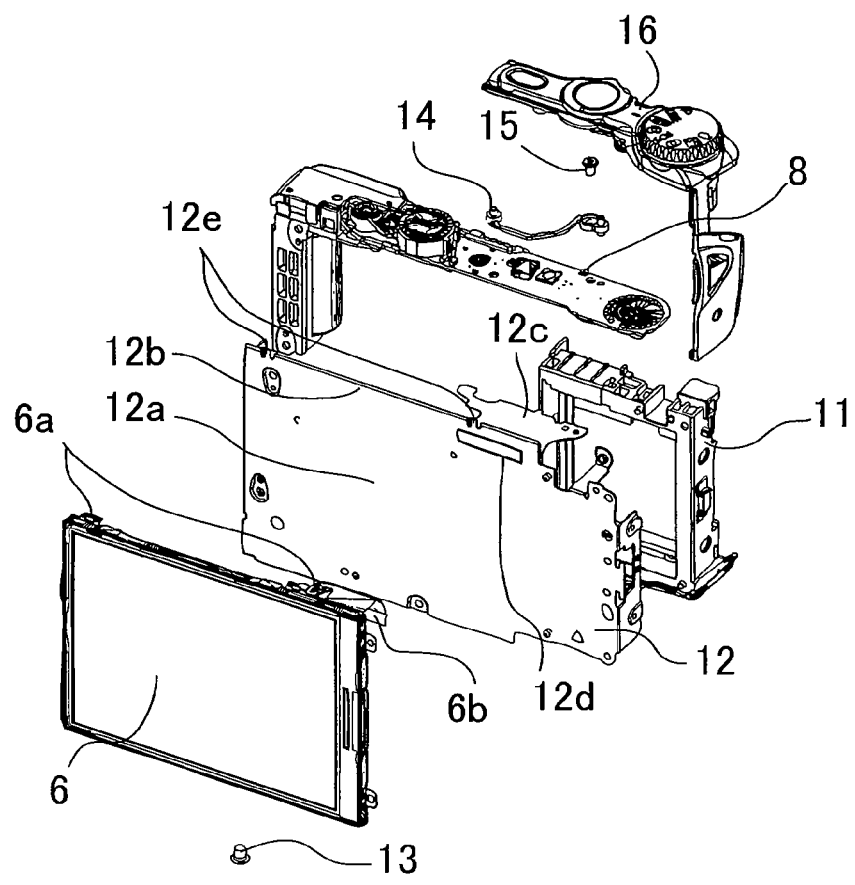
FIG. 1 is an exploded perspective view of a digital camera in the present embodiment.

Exemplary embodiments of the present invention will be described below with reference to the accompanied drawings. In each of the drawings, the same elements will be denoted by the same reference numerals and the duplicate descriptions thereof will be omitted.

Figure 2:
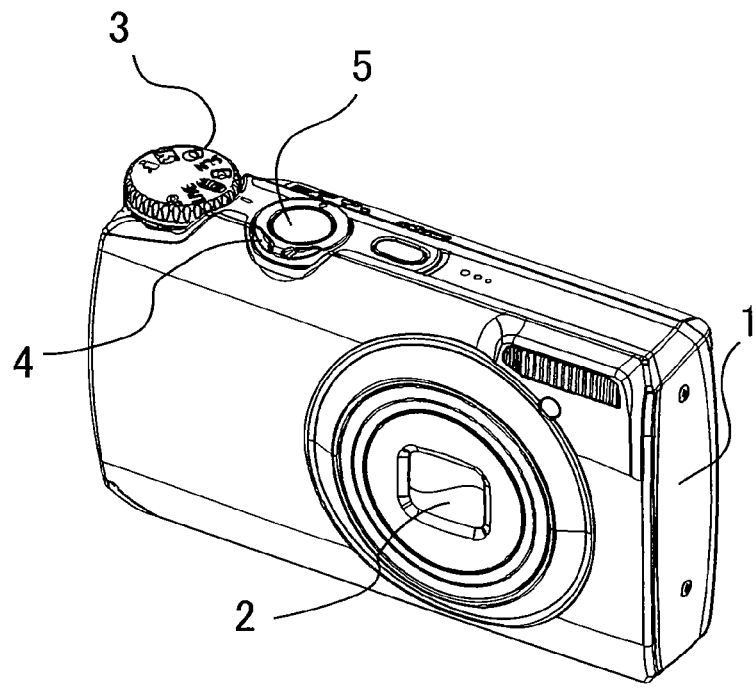
FIG. 2 is a front side perspective view of the digital camera in the present embodiment.

FIG. 2 is a front side perspective view illustrating a digital camera in the present embodiment. Reference numeral 1 denotes a digital camera and reference numeral 2 denotes a lens barrel. The digital camera 1 generates image data by receiving an object image that is obtained by the lens barrel 2 by a CCD image-pickup element. Reference numeral 3 denotes a mode dial, which enables a user to switch various kinds of image-pickup modes such as a scenery mode, a person mode, and a video mode by a rotational operation. Reference numeral 4 denotes a zoom dial, which enables the user to change an angle of field of the lens barrel 2 into a telephoto side by rotating in a clockwise direction and into a wide angle side by rotating in a counterclockwise direction. Reference numeral 5 denotes a shutter button which has a two-stage switch configuration. Focus is adjusted by driving an AF motor in the lens barrel 2 when a first-stage switch is held down. An image is stored in a memory card which is not illustrated and is removable from the digital camera 1 when a second-stage switch is held down.

Figure 3:
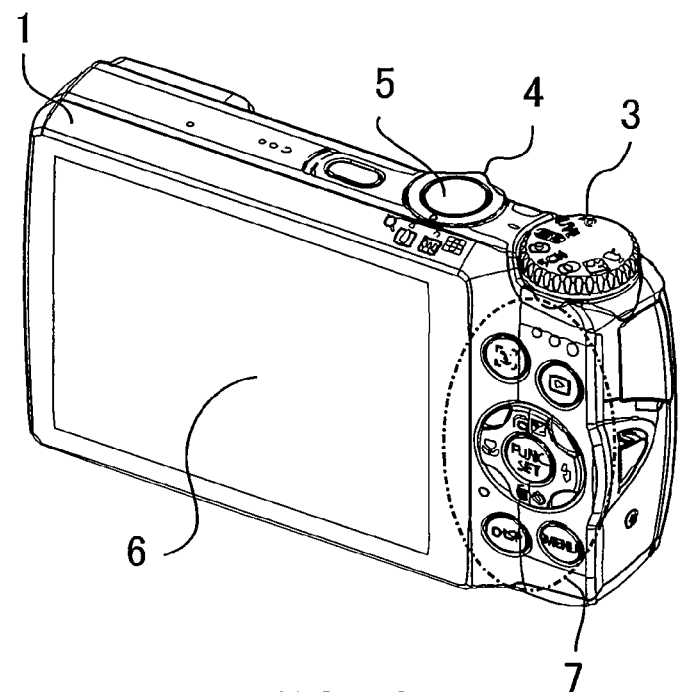
FIG. 3 is a back side perspective view of the digital camera in the present embodiment.

FIG. 3 is a back side perspective view of illustrating the digital camera in the present embodiment. Reference numeral 6 denotes a liquid crystal display portion, which enables the user to check a through image in shooting, a shot preview image, a shot image in reproduction, or the like. Reference numeral 7 denotes various kinds of operation members, which enables the user to switch a strobe mode, an AF mode, a drive mode, or the like in shooting the image, and also to perform operations such as a switch of the shot image that is to be displayed, a deletion of the image data, or the like in the reproduction.

Figure 4:
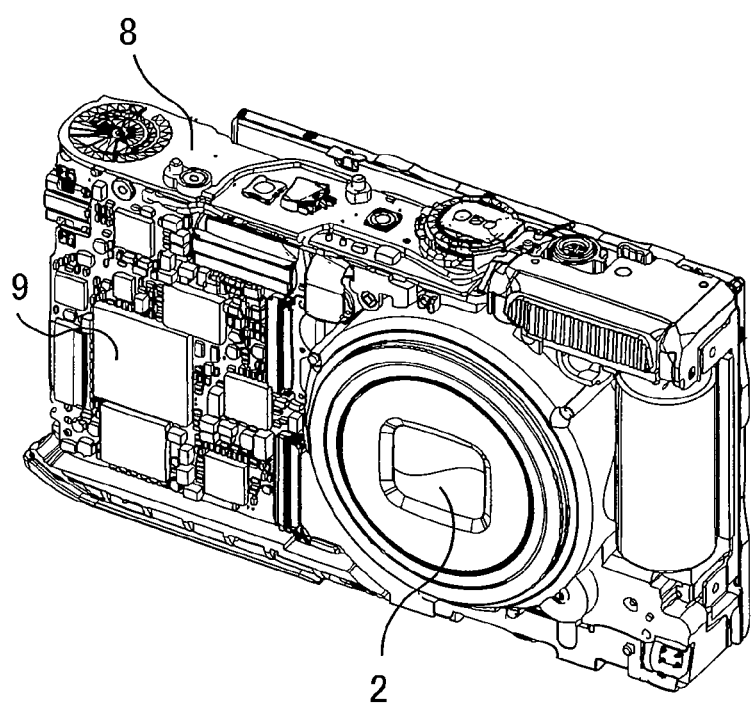
FIG. 4 is a front side perspective view of illustrating an inside of the digital camera in the present embodiment.
Figure 5:
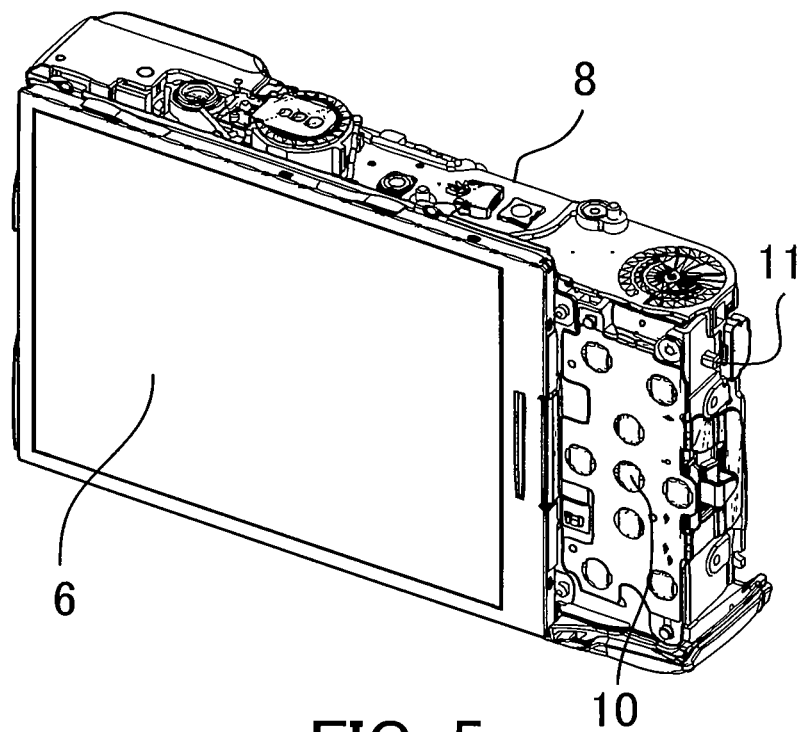
FIG. 5 is a back side perspective view of illustrating an inside of the digital camera in the present embodiment.

FIG. 4 is a front side perspective view of the digital camera which is removed from an exterior package and the operation member. FIG. 5 is a backside perspective view of the digital camera which is removed from the exterior package and the operation member. In FIGS. 4 and 5, reference numeral 8 denotes a strobe and switch substrate. Various kinds of switches corresponding to the mode dial 3, the zoom dial 4, and the shutter button 5 are mounted on an upper surface of the strobe and switch substrate 8. Electric components such as a step-up transformer to control a strobe light are mounted on a back surface of the strobe and switch substrate 8. Reference numeral 9 denotes a main substrate, and the main substrate 9 mounts integrated circuits and connectors which house the memory card to store the shot image data and be removable from the digital camera 1 in addition to various kinds of ICs. Reference numeral 10 denotes a flexible wiring substrate for the operation member, and the flexible wiring substrate 10 mounts switches corresponding to the various kinds of operation members 7. Reference numeral 11 denotes a battery compartment to house a battery which is a drive source of driving the digital camera 1, and the battery component 11 is formed by a resin such as polycarbonate.

In the digital camera 1, the strobe and switch substrate 8 is positioned lower than the top edge of the liquid crystal display portion 6 as illustrated in FIGS. 4 and 5. The digital camera 1 can be miniaturized because the upper surface operation members on the strobe and switch substrate 8 such as the mode dial 3, the zoom dial 4, and the shutter button 5 do not protrude from the liquid crystal display portion 6 as illustrated in FIGS. 2 and 3.

FIG. 1 is an exploded perspective view of illustrating only major components that are related to the present embodiment based on the state of FIG. 5, and also illustrating the upper surface operation members.

In FIG. 1, reference numeral 12 denotes a chassis (metal holding member). The chassis 12 is processed from a planate metal plate and is made of a stainless steel plate.

The chassis 12 has a planar shape to contact and hold the liquid crystal display portion 6 in a first region denoted by reference numeral 12a. Hemming is processed for almost entire area on one side of the upper portion of the chassis 12 to be strengthened, Therefore, even if the liquid crystal display portion 6 is subjected to an external force, the liquid crystal display portion 6 is not damaged because the liquid crystal display portion 6 can be strongly held on a wide surface.

Furthermore, a right-angled bending process is performed for a part of a hemming portion 12b (a second region) to be perpendicular to the hemming portion 12b, and a mounting surface 12c (a third region) is formed to hold the strobe and switch substrate 8. The word "perpendicular" means that it includes a substantially perpendicular configuration, as well as a strictly perpendicular configuration. Therefore, another component is not needed to hold the upper surface operation member. Consequently, component count and assembly man-hour can be reduced because the upper surface operation member is held only the chassis 12.

Additionally, a method of fixing the liquid crystal display portion 6 is a nail form 12e for which the hemming is not performed is formed on the hemming portion 12b to cleek a hole formed on an arm form portion 6a corresponding to a position of the nail form 12e. Then, a screw 13 is fastened on the female screw portion that is provided on the lower surface of the chassis 12 to fix the liquid crystal display portion 6.

In such case, a flexible wiring substrate 6b connected to the liquid crystal display portion 6 is bended from the right side surface to the back side of the liquid crystal display portion 6 to penetrate an opening part 12d formed on the chassis 12, and it is connected to the main substrate 9 arranged at the front side of the digital camera 1.

On the other hand, the strobe and switch substrate 8 is mounted on the mounting surface 12c that is provided on the chassis 12. In this case, after the strobe and switch substrate 8 is placed on the mounting surface 12c, a positioning member 14 is mounted to the mounting surface 12c. The positioning pins are formed so as to be protruded on both the front and back of the positioning member 14. The positioning pin protruded to the back side of the positioning member 14 penetrates positioning holds that are provided on the strobe and switch substrate 8 and the chassis 12. As a result, the strobe and switch substrate 8 and the chassis 12 are positioned.

Since then, three components of the positioning member 14, the strobe and switch substrate 8, and the chassis 12 are fastened to be held by fastening a screw 15 to a female screw portion formed on the mounting surface 12c. Further, all of the strobe and switch substrate 8, the chassis 12, and an upper surface operation unit 16 are certainly positioned by fitting the positioning pin protruded to the front side of the positioning member 14 into the concave shape of the upper surface operation unit 16.

Next, the configuration of the flexible wiring substrate 6b connected to the liquid crystal display portion 6 of the digital camera 1 will be explained by referring to a cross-sectional view of FIG. 6.

The main substrate 9 is arranged at the front side of the camera so as to thin a size of the body of the digital camera 1 in the present embodiment. Therefore, a path of the flexible wiring substrate 6b needs to avoid the lens barrel 2, the battery compartment 11, and the like so as to connect the main substrate 9.

However, wiring to connect the flexible wiring substrate 6b to the main substrate 9 is difficult because there are the flexible wiring substrate for the operation member 10 which corresponds to the various kinds of operation members 7 and a strap mounting portion on the left side when viewed from the front side of the digital camera. It is further difficult to connect the flexible wiring substrate 6b to the main substrate 9 because there are a tripod mounting portion and a battery door which performs a switching operation on the base of the digital camera 1.

In the digital camera of the present embodiment, the opening part 12d is formed adjacent to the mounting surface 12c of the strobe and switch substrate 8, and the flexible wiring substrate 6b penetrates the opening part 12d. The flexible wiring substrate 6b passes a space between the mounting surface 12c of the strobe and switch substrate 8 and the battery compartment 11 to be able to connect the main substrate 9 arranged at the front side of the digital camera 1.

Figure 6:
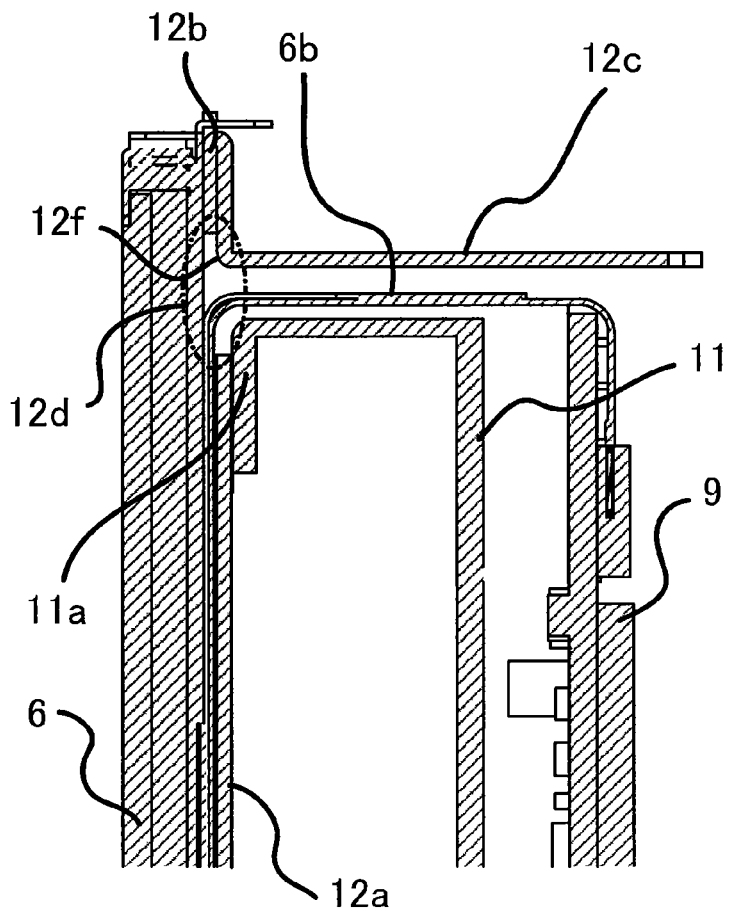
FIG. 6 is a cross-sectional view of the digital camera in the present embodiment.

In this case, the upper side of the opening part 12d is formed so as to be wider than a bending form portion 12f as illustrated in FIG. 6, and the lower side of the opening part 12d is formed so as to be wider than the top edge 11a of the battery compartment 11. As a result, the flexible wiring substrate 6*b* is not damaged in assembling because the edge face of the chassis 12 does not touch the flexible wiring substrate 6*b*.

Figure 7:
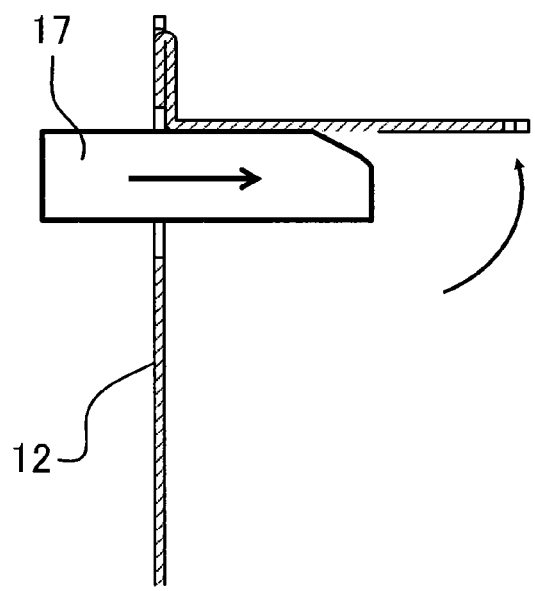
FIG. 7 is a schematic diagram of processing a chassis in the present embodiment.

Additionally, FIG. 7 is a schematic diagram of the chassis 12 in the bending processing (in a manufacturing process) in the present embodiment.

A press piece 17 can pass the opening part 12*d* as illustrated in FIG. 7 because the chassis 12 has the opening part 12*d*. Therefore, bending workability can be improved because the hemming portion 12*b* is pressed by the press piece 17.

As explained in the present embodiment, the present invention can prevent the damage caused by the external force and can hold the substrates which are arranged perpendicular to the display portion because the back surface of the display portion can be strongly held on the wide surface by a few component counts and assembly man-hours. Further, the flexible wiring substrate can pass the front side of the digital camera by forming the opening part adjacent to the bending portion. Additionally, the flexible wiring substrate 6*b* is not damaged because the edge face of the opening part can be protected.

Further, bending workability can also be improved because the opening part is formed.

The operation substrate is arranged on the upper surface of the digital camera in the present embodiment. In the case that the operation substrate is arranged on the other side of the digital camera, the same effect is obtained by the same configuration.

The present embodiment describes the digital camera. However, the present invention can also be applied to other electric apparatuses such as a video camera, a liquid crystal monitor, and a notebook computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-280671, filed on Dec. 16, 2010, which is hereby incorporated by reference herein in its entirety.

What is claimed is:

1. An electronic apparatus comprising:
an electronic device which has a flexible wiring substrate;
a holding member which holds the electronic device; and
an inner member which is arranged in the electronic apparatus,
wherein the holding member is made of a metal plate,
wherein the holding member includes a holding region which holds the electronic device,
wherein an opening part is formed on the holding region of the holding member,
wherein a hemming portion is formed by hemming a part of the holding member so that the hemming portion is located on an outer periphery of the holding region,
wherein a bending form portion is formed by bending a part of the holding member so that the bending form portion is located in the opening part,
wherein an edge portion of the inner member is located in the opening part so that a gap is provided between the bending form portion and the edge portion, and
wherein the flexible wiring substrate passes through the gap.

2. The electronic apparatus according to claim 1,
wherein a nail form portion is located on the outer periphery of the holding region, and
wherein the electronic device is fixed by hooking the nail form portion.

\* \* \* \* \*